United States Patent
Jo

(10) Patent No.: US 11,256,869 B2
(45) Date of Patent: Feb. 22, 2022

(54) WORD VECTOR CORRECTION METHOD

(71) Applicant: LG ELECTRONICS INC., Seoul (KR)

(72) Inventor: Hwiyeol Jo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 245 days.

(21) Appl. No.: 16/553,014

(22) Filed: Aug. 27, 2019

(65) Prior Publication Data

US 2019/0384817 A1    Dec. 19, 2019

Related U.S. Application Data

(63) Continuation of application No. PCT/KR2019/095025, filed on May 31, 2019.

(Continued)

(51) Int. Cl.
*G06N 20/00* (2019.01)
*G06F 16/33* (2019.01)
(Continued)

(52) U.S. Cl.
CPC .......... *G06F 40/30* (2020.01); *G06F 16/3347* (2019.01); *G06F 40/247* (2020.01); *G06N 20/00* (2019.01)

(58) Field of Classification Search
CPC .... G06F 40/30; G06F 40/247; G06F 16/3347; G06F 40/216; G06F 40/284; G06N 20/00
(Continued)

(56) References Cited

U.S. PATENT DOCUMENTS 5,619,709 A * 4/1997 Caid ................. G06F 16/58
715/209
5,765,127 A * 6/1998 Nishiguchi ......... G10L 19/0212
704/208

(Continued)

FOREIGN PATENT DOCUMENTS

| JP | 2016224482 | 12/2016 |
|---|---|---|
| JP | 2017152042 | 8/2017 |
| KR | 1020170141570 | 12/2017 |

OTHER PUBLICATIONS

PCT International Application No. PCT/KR2019/095025, Notification of Transmittal of the International Search Report and the Written Opinion of the International Searching Authority, or Declaration dated Sep. 19, 2019, 9 pages.

(Continued)

*Primary Examiner* — Akwasi M Sarpong
(74) *Attorney, Agent, or Firm* — Lee, Hong, Degerman, Kang & Waimey PC

(57) ABSTRACT

The present disclosure provides a word vector correction method using artificial intelligence technology. A word vector correction method using a word vector with n dimensions includes generating a first (n+1)-dimensional word vector using an average of elements included in a first n-dimensional word vector; generating a second (n+1)-dimensional word vector using an average of elements included in a second n-dimensional word vector; and determining whether a first word corresponding to the first word vector and a second word corresponding to the second word vector are similar to each other on the basis of specified synonym information.

15 Claims, 5 Drawing Sheets

Related U.S. Application Data

(60) Provisional application No. 62/728,063, filed on Sep. 6, 2018.

(51) Int. Cl.
*G06F 40/247* (2020.01)
*G06F 40/30* (2020.01)

(58) Field of Classification Search
USPC .................................. 704/203, 232, 214, 230
See application file for complete search history.

(56) References Cited

U.S. PATENT DOCUMENTS

| | | | | |
|---|---|---|---|---|
| 5,920,839 | A * | 7/1999 | Iso ........................ | G10L 15/142 704/256 |
| 6,061,652 | A * | 5/2000 | Tsuboka ................ | G10L 15/142 704/245 |
| 6,523,026 | B1 * | 2/2003 | Gillis ................... | G06F 16/3332 |
| 9,147,133 | B2 * | 9/2015 | Fujimura .............. | G10L 15/065 |
| 9,430,563 | B2 * | 8/2016 | Clinchant ............. | G06K 9/6232 |
| 10,268,685 | B2 * | 4/2019 | Zeng ...................... | G06F 40/30 |
| 10,489,507 | B2 * | 11/2019 | Li .......................... | G06N 20/00 |
| 10,762,298 | B2 * | 9/2020 | Krishnapura Subbaraya .............. | G06F 40/30 |
| 10,789,942 | B2 * | 9/2020 | Min ....................... | G10L 15/063 |
| 10,803,248 | B1 * | 10/2020 | Arfa ...................... | G06F 40/295 |
| 2009/0043566 | A1 * | 2/2009 | Amada .................. | G10L 17/20 704/203 |
| 2013/0204885 | A1 | 8/2013 | Clinchant et al. | |
| 2014/0249799 | A1 * | 9/2014 | Yih ......................... | G06F 16/36 704/9 |
| 2017/0161393 | A1 * | 6/2017 | Oh .......................... | H04L 51/32 |
| 2018/0121555 | A1 * | 5/2018 | Li ......................... | G06F 16/9535 |
| 2018/0225576 | A1 * | 8/2018 | Pappu ...................... | G06N 5/04 |
| 2018/0349350 | A1 * | 12/2018 | Zhu ........................ | G06F 40/284 |
| 2019/0050388 | A1 * | 2/2019 | Eugster ................. | G06F 40/253 |
| 2019/0108439 | A1 * | 4/2019 | Lu ......................... | G06N 3/0454 |
| 2019/0171665 | A1 * | 6/2019 | Navlakha .............. | G06F 16/532 |
| 2020/0026908 | A1 * | 1/2020 | Henderson ............ | G06K 9/6267 |
| 2020/0152295 | A1 * | 5/2020 | Gibson .................. | G16C 20/62 |
| 2020/0175411 | A1 * | 6/2020 | King ...................... | G06N 20/20 |

OTHER PUBLICATIONS

Jo, H. et al., "Extrofilling: Enriching Word Representation and its Vector Space with Semantic Lexicons", arXiv: 1804.07946v2, Jun. 2018, 6 pages.

* cited by examiner

FIG. 3

Word Embedding Table''' = LDA( Word Embedding Table'', [r_1', r_2', ..., ..., r_D'] , [1_1, 1_2, ..., ..., 1_D] )

WORD VECTOR CORRECTION METHOD

CROSS-REFERENCE TO RELATED APPLICATION

This application is a continuation of International Application No. PCT/KR2019/095025, filed on May 31, 2019, which also claims the benefit of U.S. Provisional Patent Application No. 62/728,063, filed on Sep. 6, 2018, the contents of which are all hereby incorporated by reference herein in their entirety.

BACKGROUND OF THE INVENTION

1. Field of the Invention

The present invention relates to a word vector correction method.

2. Background of the Invention

Along with the development of artificial intelligence technology, the need for natural language processing is increasing day by day. A natural language refers to any language that humans use in everyday life, and natural language processing refers to analyzing the meaning of a natural language to enable a computer to process the natural language.

One major issue of this natural language processing is to check similarities of words or documents, and the similarities can be calculated by digitizing the words or documents using a term-document matrix (TDM), Word2Vec, and the like and then calculating the similarities using the Euclidean distance, cosine similarity, or the like.

For example, a representation obtained by digitizing a word using a vector may be called a word vector, and such a word vector occupies any space in a vector space. Words are located close to or far from one another in the vector space depending on the similarity. In this case, similar words are located closer to each other.

SUMMARY OF THE INVENTION

Therefore, an aspect of the detailed description is to provide a word vector correction method capable of clearly distinguishing between a similar word and a non-similar word.

To achieve these and other advantages and in accordance with the purpose of this specification, as embodied and broadly described herein, there is provided a word vector correction method using a word vector with n dimensions, the word vector correction method including generating a first (n+1)-dimensional word vector using an average of elements included in a first n-dimensional word vector, generating a second (n+1)-dimensional word vector using an average of elements included in a second n-dimensional word vector, determining whether a first word corresponding to the first word vector and a second word corresponding to the second word vector are similar to each other on the basis of specified synonym information, updating values of $(n+1)^{st}$ elements included in the first and second (n+1)-dimensional word vectors when a result of the determination is that the first word and the second word are similar to each other, and correcting the first and second n-dimensional word vectors by reflecting the updated values of the $(n+1)^{st}$ elements in the elements included in the first and second n-dimensional word vectors.

Depending on whether the first word corresponding to the first n-dimensional word vector and the second word corresponding to the second n-dimensional word vector are similar to each other, whether to update the values of the $(n+1)^{st}$ elements of the first and second (n+1)-dimensional word vectors may be determined.

The updating may include calculating an average of the $(n+1)^{st}$ elements included in the first and second (n+1)-dimensional word vectors and changing the values of the $(n+1)^{st}$ elements included in the first and second (n+1)-dimensional word vectors to the calculated average when the first word and the second word are similar to each other.

When a result of the determination is that the first word and the second word are not similar to each other, the values of the $(n+1)^{st}$ elements included in the first and second (n+1)-dimensional word vectors may not be updated.

The value of the $(n+1)^{st}$ element included in the first (n+1)-dimensional word vector may be the average of the elements included in the first n-dimensional word vector, and the value of the $(n+1)^{st}$ element included in the second (n+1)-dimensional word vector may be the average of the elements included in the second n-dimensional word vector.

Values of first to $n^{th}$ elements included in the first (n+1)-dimensional word vector may be the same as those of first to $n^{th}$ elements included in the first n-dimensional word vector, and values of first to $n^{th}$ elements included in the second (n+1)-dimensional word vector may be the same as those of first to $n^{th}$ elements included in the second n-dimensional word vector.

The correcting may include applying a linear discriminant analysis (LDA) algorithm to the first and second (n+1)-dimensional word vectors to disperse the values of the $(n+1)^{st}$ elements to the elements included in the first and second n-dimensional word vectors.

In the n dimensions, a distance between the first and second n-dimensional word vectors after the correction may be different from a distance between the first and second n-dimensional word vectors before the correction.

When the first word and the second word are similar to each other, the distance between the first and second n-dimensional word vectors after the correction may be less than the distance between the first and second n-dimensional word vectors before the correction.

When the first word and the second word are not similar to each other, the distance between the first and second n-dimensional word vectors after the correction may be greater than the distance between the first and second n-dimensional word vectors before the correction.

Advantageous Effects of the Invention

As described above, by expanding the dimensions of the word vectors, the present invention can reflect similarities of words corresponding to the word vectors in the elements of the word vectors with expanded dimensions. Accordingly, the word vectors with expanded dimensions are updated to reflect the similarities of the words. The word vectors with expanded dimensions are restored to their original dimensions through a specific technique. As a result of the restoration, the distance between similar words in the vector space decreases, and the distance between non-similar words increases. Accordingly, according to the present invention, the distinction between a similar word and a non-similar word becomes clear. As a result, it is possible to more accurately determine similar words.

BRIEF DESCRIPTION OF THE DRAWINGS

FIG. 3 shows conceptual views illustrating a word vector correction method according to the present invention.

FIGS. 4A, 4B, 4C, and 4D are conceptual views illustrating dimension expansion and dimension reduction associated with the word vector correction method according to the present invention.

DETAILED DESCRIPTION OF THE INVENTION

Figure 1:
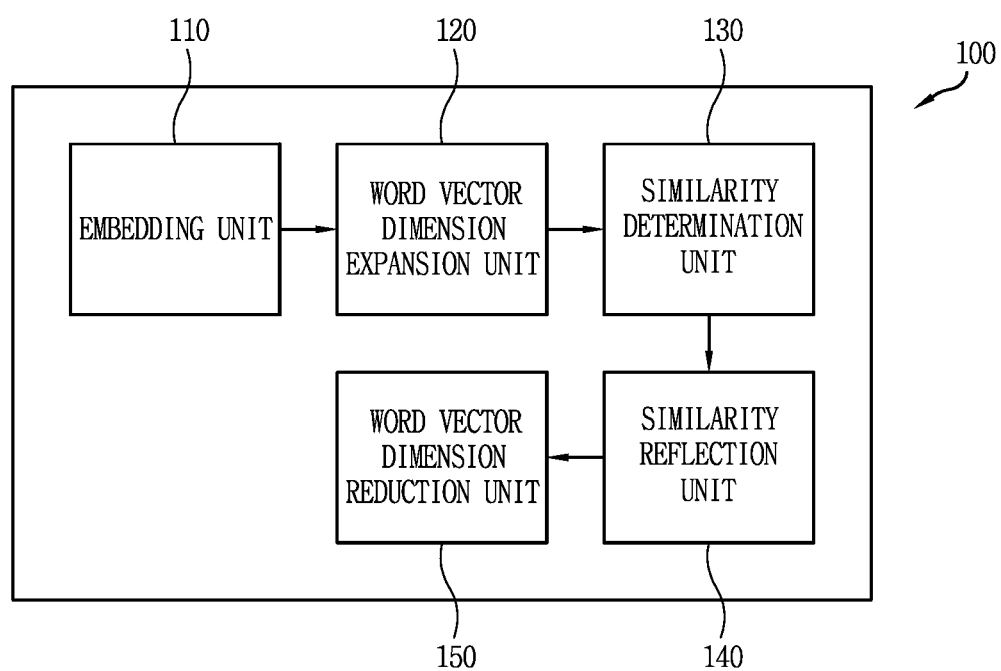
FIG. 1 is a block diagram illustrating a word vector correction according to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

First, natural language processing (NLP) is a technology that enables a computer to understand and analyze a human language, and is the most important technology for implementing artificial intelligence.

Natural language processing is to express a word in a computer-executable numerical form so that the computer can recognize the meaning of the word. A representative method for the natural language processing is a word embedding model that changes a word to a vector. Word2vec As is an example of the word embedding model.

Meanwhile, a word may be expressed as a vector through the word embedding model, and this vector is called a "word vector" herein. A word expressed as a vector has specific coordinates corresponding to the vector in the vector space.

Words in the vector space are located close to or far from each other depending on similarity or non-similarity between the words.

For example, within the vector space, the distance between the word "animal" and the word "plant" may be farther than the distance between the word "animal" and the word "lion."

In this way, words are expressed as separate vectors. By using the words expressed as the vectors in the natural language processing, the meanings of a word and a sentence composed of words are recognized and understood.

Meanwhile, as described above, the performance of the natural language processing can be further improved if a vector of a word can more accurately indicate a degree of similarity of the word.

Figure 2:
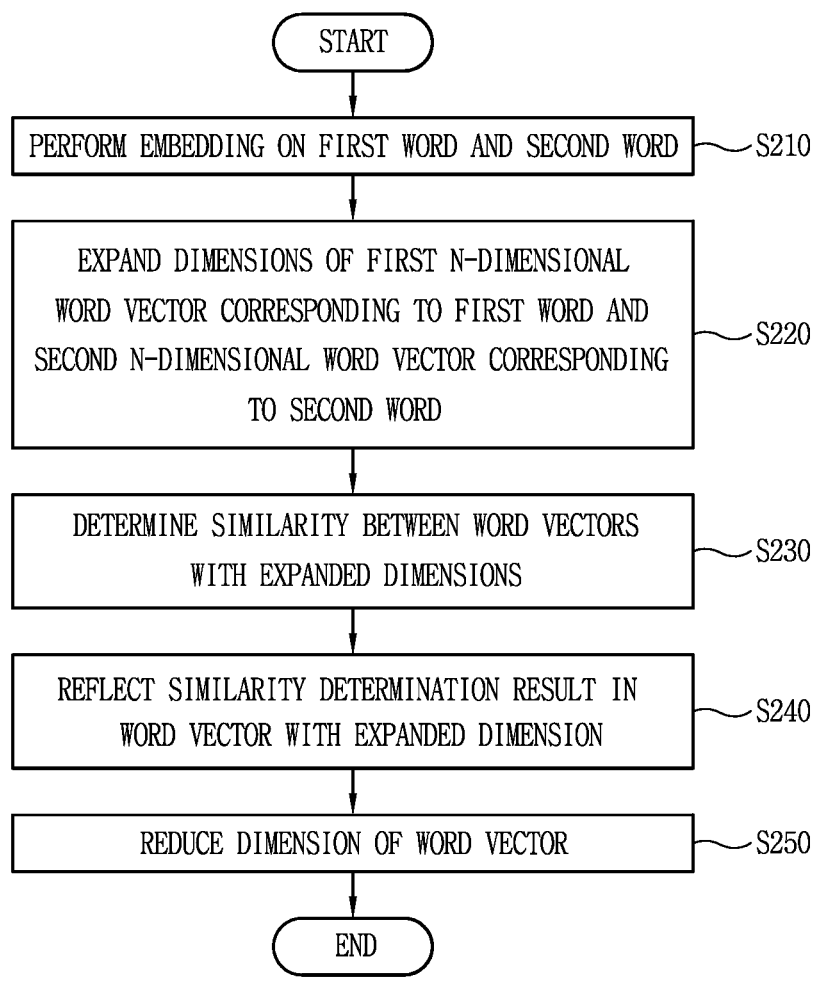
FIG. 2 is a flowchart illustrating the word vector correction method according to the present invention.
Figure 5A:
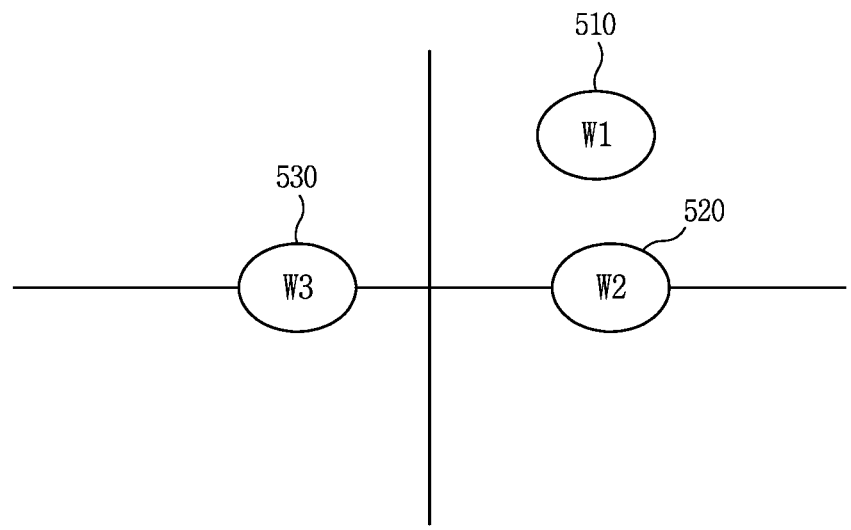
FIGS. 5A and 5B are conceptual views illustrating a result obtained by performing the word vector correction method according to the present invention.
Figure 5B:
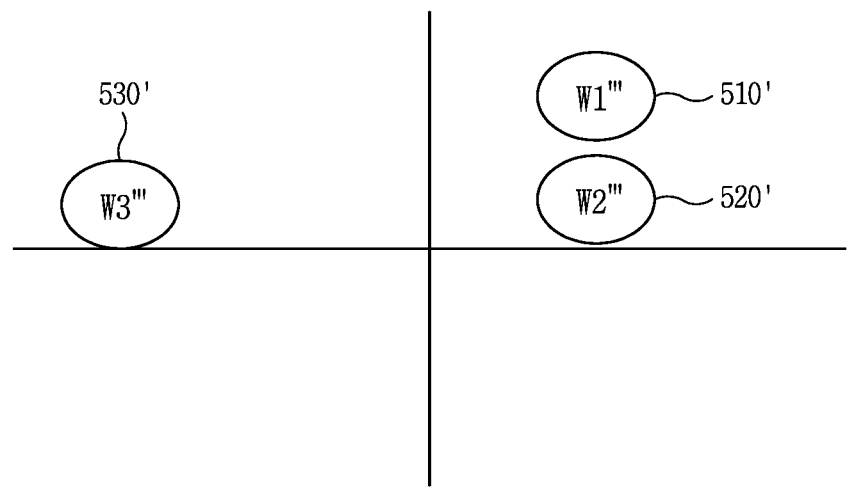

Thus, the present invention proposes a method of more accurately expressing a degrees of similarity between words indicated by a word vector by correcting the word vector. The word vector correction method will be described in detail below with reference to the accompanying drawings. FIG. 1 is a block diagram illustrating a word vector correction according to the present invention, and FIG. 2 is a flowchart illustrating the word vector correction method according to the present invention. Furthermore, FIG. 3 shows conceptual views illustrating the word vector correction method according to the present invention, and FIGS. 4A, 4B, 4C, and 4D are conceptual views illustrating dimension expansion and dimension reduction associated with the word vector correction method according to the present invention. FIGS. 5A and 5B are conceptual views illustrating a result obtained by performing the word vector correction method according to the present invention.

A word vector correction system 100 for performing the word vector correction method according to the present invention may include an embedding unit 110, a word vector dimension expansion unit 120, a similarity determination unit 130, a similarity reflection unit 140, and a word vector dimension reduction unit 150.

Here, the embedding unit 110 may be called a "word vector embedding unit" and is configured to digitize a word to create a word vector.

The embedding unit 110 digitizes words included in any document to create word vectors having different vector coordinates.

The dimensions of the word vector created by the embedding unit 110 may correspond to the number of elements included in the word vector. For example, a word vector composed of 10 elements may be expressed as "ten-dimensional word vector."

In the present invention, the dimensions of the word vector are not specifically limited, but are arbitrarily named "n-dimensions."

The word vector correction method according to the present invention is not limited to the number of dimensions of the word vector, but can be applied to all of the dimensions in common.

Next, the word vector dimension expansion unit 120 is configured to expand an n-dimensional word vector to a word vector having more than n dimensions. For example, the word vector dimension expansion unit 120 expands an n-dimensional word vector to an (n+1)-dimensional word vector.

A method of the word vector dimension expansion unit 120 converting an n-dimensional word vector into an (n+1)-dimensional word vector which is one dimension more than the n-dimensional word vector. It is assumed that there are first and second n-dimensional word vectors as a result of word embedding of the embedding unit 110.

The word vector dimension expansion unit 120 sums all values of n elements included in a first n-dimensional word vector W1, averages the sum, and generates a first (n+1)-dimensional word vector W1' by using the average. In detail, the word vector dimension expansion unit 120 assigns elements included in the first n-dimensional word vector W1 to the first (n+1)-dimensional word vector W1' as first to $n^{th}$ elements. Also, the word vector dimension expansion unit 120 assigns an average of the first to $n^{th}$ elements included in the first n-dimensional word vector W1 to the first (n+1)-dimensional word vector W1' as an $(n+1)^{st}$ element.

Likewise, the word vector dimension expansion unit 120 sums all values of n elements included in a second n-dimensional word vector W2, averages the sum, and generates a second (n+1)-dimensional word vector W2' by using the average. In detail, the word vector dimension expansion unit 120 assigns elements included in the second n-dimensional word vector W2 to the second (n+1)-dimensional word vector W2' as first to $n^{th}$ elements. Also, the word vector dimension expansion unit 120 assigns an average of the first to $n^{th}$ elements included in the second n-dimensional word vector W2 to the second (n+1)-dimensional word vector W2' as an $(n+1)^{st}$ element.

In this way, the word vector dimension expansion unit 120 may expand the dimensions of each word vector using elements included in a corresponding word vector.

That is, the value of the $(n+1)^{st}$ element included in the first (n+1)-dimensional word vector W1' is an average of the elements included in the first n-dimensional word vector W1. Also, the value of the $(n+1)^{st}$ element included in the second (n+1)-dimensional word vector W2' is an average of the elements included in the second n-dimensional word vector W2.

Further, the values of the first to $n^{th}$ elements included in the first (n+1)-dimensional word vector W1' are the same as those of the first to $n^{th}$ elements included in the first n-dimensional word vector W1. Likewise, the values of the first to $n^{th}$ elements included in the second (n+1)-dimensional word vector W2' are the same as those of the first to $n^{th}$ elements included in the second n-dimensional word vector W2.

Meanwhile, when n-dimensional word vectors are expanded to (n+1)-dimensional word vectors, the similarity determination unit 130 determines a similarity between the (n+1)-dimensional word vectors.

In detail, the similarity determination unit 130 determines whether a first word corresponding to the first word vector W1 or W1' and a second word corresponding to the second word vector W2 or W2' are similar to each other on the basis of specified synonym information.

Here, the specified synonym information is a database including synonym information for words and may refer to data such as Global Vectors (GloVe).

The similarity determination unit 130 determines whether at least two word vectors, which are targets for similarity determination, are similar to each other on the basis of the specified synonym information.

On the basis of the determination result of the similarity determination unit 130, the similarity reflection unit 140 may update the values of the $(n+1)^{st}$ elements included in the first and second (n+1)-dimensional word vectors W1' and W2' when the first word corresponding to the first word vector W1 or W1' and the second word corresponding to the second word vector W2 or W2' are similar to each other. The similarity reflection unit 140 may be referred to as "update unit."

Depending on whether the first word corresponding to the first word vector W1 or W1' and the second word corresponding to the second word vector W2 or W2' are similar to each other, the similarity reflection unit 140 determines whether to update the values of the $(n+1)^{st}$ elements included in the first and second (n+1)-dimensional word vectors W1' and W2'.

In detail, when the first word and the second word are similar to each other, the similarity reflection unit 140 calculates an average of the $(n+1)^{st}$ elements included in the first and second (n+1)-dimensional word vectors W1' and W2' and then changes the values of the $(n+1)^{st}$ elements included in the first and second (n+1)-dimensional word vectors W1' and W2' to the calculated average.

Accordingly, when the first word and the second word are similar to each other, the first and second (n+1)-dimensional word vectors W1' and W2' are changed to first and second (n+1)-dimensional word vectors W1" and W2" in which the values of $(n+1)^{st}$ elements are changed.

When the determination result of the similarity determination unit 130 is that the first word and the second word are not similar to each other, the values of the $(n+1)^{st}$ elements included in the first and second (n+1)-dimensional word vectors are not updated.

That is, when the first word and the second word are not similar to each other, the similarity reflection unit 140 does not change but maintain the values of the $(n+1)^{st}$ elements included in the first and second (n+1)-dimensional word vectors.

As described above, according to the present invention, only when the first word and the second word are similar to each other, the similarity reflection unit 140 associates the first and second word vectors W1, W1', W1", W2, W2', and W2" by updating the values of the $(n+1)^{st}$ elements with the same value.

The first and second word vectors W1, W1', W1", W2, W2', and W2" may maintain a closer distance to each other in the vector space when the values of the $(n+1)^{st}$ elements are the same than when the values of the $(n+1)^{st}$ elements are not the same.

When the update of the $(n+1)^{st}$ elements is completed, the word vector dimension reduction unit 150 reduces the (n+1)-dimensional word vector back to the n-dimensional word vector.

The word vector dimension reduction unit 150 corrects the first and second n-dimensional word vectors W1 and W2 by reflecting the values of the $(n+1)^{st}$ elements of the first and second (n+1)-dimensional word vectors W1' or W1" and W2' or W2" in the elements included in the first and second n-dimensional word vectors W1 and W2.

The word vector dimension reduction unit 150 corrects the first and second (n+1)-dimensional word vectors W1' or W1" and W2' or W2" to be the first and second n-dimensional word vectors W1 and W2" by applying a linear discriminant analysis (LDA) algorithm to the first and second (n+1)-dimensional word vectors W1' or W1" and W2' or W2". The correction result shows that at least one of the values of the elements of the first and second n-dimensional word vectors W1''' and W2''' after the correction may be different from a corresponding one of the values of the elements of the first and second word vectors W1 and W2 before the correction.

The word vector dimension reduction unit 150 may correct the first and second n-dimensional word vectors W1 and W2 by applying an LDA algorithm (see FIG. 3B) to the first and second (n+1)-dimensional word vectors W1' or W1" and W2' or W2" to disperse the values of the $(n+1)^{st}$ elements to the elements included in the first and second n-dimensional word vectors W1 and W2.

As described above, the correction result shows that in the n dimensions, the distance between the first and second n-dimensional word vectors W1''' and W2''' after the correction may be different from the distance between the first and second n-dimensional word vectors W1 and W2 before the correction.

According to the present invention, when the first word and the second word are similar to each other, the distance between the first and second n-dimensional word vectors W1''' and W2''' after the correction may be less than the distance between the first and second n-dimensional word vectors W1 and W2 before the correction. Furthermore, when the first word and the second word are not similar to each other, the distance between the first and second n-dimensional word vectors W1''' and W2''' after the correction may be greater than the distance between the first and second n-dimensional word vectors W1 and W2 before the correction. By expanding the dimensions of the word vectors, the present invention can reflect similarities of words corresponding to the word vectors in the elements of the word vectors with expanded dimensions. Accordingly, the word vectors with expanded dimensions are updated to reflect the similarities of the words. The word vectors with expanded dimensions are restored to their original dimensions through a specific technique. As a result of the restoration, the distance between similar words in the vector space decreases, and the distance between non-similar words increases. Accordingly, according to the present invention, the distinction between a similar word and a non-similar word becomes clear. As a result, it is possible to more accurately determine similar words.

The word vector correction method will be described with reference to the description of the above-described word vector correction system 100. First, an embedding process is performed on a first word and a second word (S210).

In detail, the embedding process may be performed by the embedding unit 110. In the embedding process, words included in any document are digitized and converted into word vectors having different vector coordinates.

The dimensions of such a word vector generated during the embedding process correspond to the number of elements included in the word vector. For example, a word vector composed of 10 elements may be expressed as a ten-dimensional word vector. In the present invention, the dimensions of the word vector are not specifically limited, but are arbitrarily named "n-dimensions."

During the embedding process (S210), an n-dimensional word vector is generated. In detail, the n-dimensional word vector may include a plurality of word vectors composed of n elements, as shown in FIG. 4.

As shown in FIG. 4A, the plurality of word vectors may include a first word vector W1 corresponding to a first word and a second word vector W2 corresponding to a second word.

Next, a process of converting the n-dimensional word vector into an (n+1)-dimensional word vector which is one dimension more than the n-dimensional word vector is performed (S220).

The word vector dimension expansion unit 120 converts the n-dimensional word vector into the (n+1)-dimensional word vector which is one dimension more than the n-dimensional word vector. As shown in FIG. 4B, the word vector dimension expansion unit 120 converts the first n-dimensional word vector W1 corresponding to the first word into a first (n+1)-dimensional word vector W1' and converts the second n-dimensional word vector W2 corresponding to the second word into a second (n+1)-dimensional word vector W2'.

In the expansion of the word vector dimension, as shown in FIG. 4B, the word vector dimension expansion unit 120 sums all the values of n elements included in the n-dimensional word vector, averages the sum, and assigns the average to the value of an $(n+1)^{st}$ element of the (n+1)-dimensional word vector. Also, the elements of the n-dimensional word vector are assigned to the (n+1)-dimensional word vector as the values of first to $n^{th}$ elements of the (n+1)-dimensional word vector.

For example, the word vector dimension expansion unit 120 sums all values of n elements included in the first n-dimensional word vector W1, averages the sum, and generates a first (n+1)-dimensional word vector W1' by using the average. In detail, the word vector dimension expansion unit 120 assigns elements included in the first n-dimensional word vector W1 to the first (n+1)-dimensional word vector W1' as first to $n^{th}$ elements. Also, the word vector dimension expansion unit 120 assigns an average of the first to $n^{th}$ elements included in the first n-dimensional word vector W1 to the first (n+1)-dimensional word vector W1' as an $(n+1)^{st}$ element.

Likewise, the word vector dimension expansion unit 120 sums all values of n elements included in a second n-dimensional word vector W2, averages the sum, and generates a second (n+1)-dimensional word vector W2' by using the average. In detail, the word vector dimension expansion unit 120 assigns elements included in the second n-dimensional word vector W2 to the second (n+1)-dimensional word vector W2' as first to $n^{th}$ elements. Also, the word vector dimension expansion unit 120 assigns an average of the first to $n^{th}$ elements included in the second n-dimensional word vector W2 to the second (n+1)-dimensional word vector W2' as an $(n+1)^{st}$ element.

In this way, the word vector dimension expansion unit 120 may expand the dimensions of each word vector using elements included in a corresponding word vector.

That is, the value of the $(n+1)^{st}$ element included in the first (n+1)-dimensional word vector W1' is an average of the elements included in the first n-dimensional word vector W1. Also, the value of the $(n+1)^{st}$ element included in the second (n+1)-dimensional word vector W2' is an average of the elements included in the second n-dimensional word vector W2.

Further, the values of the first to $n^{th}$ elements included in the first (n+1)-dimensional word vector W1' are the same as those of the first to $n^{th}$ elements included in the first n-dimensional word vector W1. Likewise, the values of the first to $n^{th}$ elements included in the second (n+1)-dimensional word vector W2' are the same as those of the first to $n^{th}$ elements included in the second n-dimensional word vector W2.

When word vectors are expanded in this way, a process of determining a similarity between the word vectors with expanded dimensions is performed (S230).

When n-dimensional word vectors are expanded to (n+1)-dimensional word vectors, the similarity determination unit 130 determines a similarity between the (n+1)-dimensional word vectors.

In detail, the similarity determination unit 130 determines whether a first word corresponding to the first word vector W1 or W1' and a second word corresponding to the second word vector W2 or W2' are similar to each other on the basis of specified synonym information.

The similarity determination unit 130 may determine a similarity between at least two (n+1)-dimensional word vectors. The specified synonym information may include similarity information between at least two words.

Here, the specified synonym information is a database including synonym information for words and may refer to data such as GloVe. The similarity determination unit 130 determines whether at least two word vectors, which are targets for similarity determination, are similar to each other on the basis of the specified synonym information.

When similarity determination is performed in this way, a process of reflecting a result of the similarity determination in the word vectors with expanded dimensions is performed (S240).

On the basis of the determination result of the similarity determination unit 130, the similarity reflection unit 140 may update the values of the $(n+1)^{st}$ elements included in the first and second (n+1)-dimensional word vectors W1' and W2' when the first word corresponding to the first word vector W1 or W1' and the second word corresponding to the second word vector W2 or W2' are similar to each other. The similarity reflection unit 140 may be referred to as "update unit."

Depending on whether the first word corresponding to the first word vector W1 or W1' and the second word corresponding to the second word vector W2 or W2' are similar to each other, the similarity reflection unit 140 determines whether to update the values of the $(n+1)^{st}$ elements included in the first and second (n+1)-dimensional word vectors W1' and W2'.

In detail, as shown in FIG. 4C, when the first word and the second word are similar to each other, the similarity reflection unit 140 calculates an average of the $(n+1)^{st}$ elements included in the first and second (n+1)-dimensional word vectors W1' and W2' (e.g., 0.45 as shown in FIG. 4C) and then changes the values of the $(n+1)^{st}$ elements included in the first and second (n+1)-dimensional word vectors W1' and W2' to the calculated average.

Accordingly, when the first word and the second word are similar to each other, the first and second (n+1)-dimensional word vectors W1' and W2' are changed to first and second (n+1)-dimensional word vectors W1" and W2" in which the values of $(n+1)^{st}$ elements are changed.

When the determination result of the similarity determination unit 130 is that the first word and the second word are not similar to each other, the values of the $(n+1)^{st}$ elements included in the first and second (n+1)-dimensional word vectors are not updated.

That is, when the first word and the second word are not similar to each other, the similarity reflection unit 140 does not change but maintain the values of the $(n+1)^{st}$ elements included in the first and second (n+1)-dimensional word vectors W1' and W2'. In this case, as shown in FIG. 4B, the values of the elements of the first and second (n+1)-dimensional word vectors W1' and W2' are maintained as they are. As described above, according to the present invention, only when the first word and the second word are similar to each other, the similarity reflection unit 140 associates the first and second word vectors W1, W1', W1", W2, W2', and W2" by updating the values of the $(n+1)^{st}$ elements with the same value.

The first and second word vectors W1, W1', W1", W2, W2', and W2" may maintain a closer distance to each other in the vector space when the values of the $(n+1)^{st}$ elements are the same than when the values of the $(n+1)^{st}$ elements are not the same.

When the reflection of the similarity determination is completed in this way, a process of reducing the dimensions of the word vector is performed (S250).

That is, when the update of the $(n+1)^{st}$ elements is completed, the word vector dimension reduction unit 150 reduces the (n+1)-dimensional word vector back to the n-dimensional word vector.

The word vector dimension reduction unit 150 corrects the first and second n-dimensional word vectors W1 and W2 by reflecting the values of the $(n+1)^{st}$ elements of the first and second (n+1)-dimensional word vectors W1' or W1" and W2' or W2" in the elements included in the first and second n-dimensional word vectors W1 and W2.

The word vector dimension reduction unit 150 corrects the first and second (n+1)-dimensional word vectors W1' or W1" and W2' or W2" to be the first and second n-dimensional word vectors W1'" and W2'" by applying an LDA algorithm to the first and second (n+1)-dimensional word vectors W1' or W1" and W2' or W2". The correction result shows that at least one of the values of the elements of the first and second n-dimensional word vectors W1'" and W2'" after the correction may be different from a corresponding one of the values of the elements of the first and second word vectors W1 and W2 before the correction.

The word vector dimension reduction unit 150 may correct the first and second n-dimensional word vectors W1 and W2 by applying an LDA algorithm to the first and second (n+1)-dimensional word vectors W1' or W1" and W2' or W2" to disperse the values of the $(n+1)^{st}$ elements to the elements included in the first and second n-dimensional word vectors W1 and W2.

As described above, the correction result shows that in the n dimensions, the distance between the first and second n-dimensional word vectors W1'" and W2'" after the correction may be different from the distance between the first and second n-dimensional word vectors W1 and W2 before the correction.

According to the present invention, as shown in FIGS. 5A and 5B, when the first word and the second word are similar to each other, the distance between the first and second n-dimensional word vectors W1'" (510'") and W2'" (520'") after the correction may be less than the distance between the first and second n-dimensional word vectors W1 510 and W2 520 before the correction. Furthermore, when the first word and the second word are not similar to each other, the distance between the first and second n-dimensional word vectors W1'" (510'") and W2'" (520'") after the correction may be greater than the distance between the first and second n-dimensional word vectors W1 (510) and W2 (520) before the correction. Meanwhile, as shown in FIGS. 5A and 5B, when a third word is not similar to the first word and the second word, the distance between a third n-dimensional word vector W3 (530) corresponding to the third word and the first and second n-dimensional word vectors W1 (510) and W2 (530) may be greater before the correction than after the correction (see 510'", 520'", and 530'" of FIG. 5B).

As described above, by expanding the dimensions of the word vectors, the present invention can reflect similarities of words corresponding to the word vector in the elements of the word vectors with expanded dimensions. Accordingly, the word vectors with expanded dimensions are updated to reflect the similarities of the words.

The word vectors with expanded dimensions are restored to their original dimensions through a specific technique. As a result of the restoration, the distance between similar words in the vector space decreases, and the distance between non-similar words increases. Accordingly, according to the present invention, the distinction between a similar word and a non-similar word becomes clear. As a result, similar words may be more accurately determined.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor or the controller. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. A word vector correction method comprising:
   generating a first (n+1)-dimensional word vector corresponding to a first n-dimensional word vector for a first word, wherein first to $n^{th}$ values of the first (n+1)-dimensional word vector are set to be equal to first to $n^{th}$ values of the first n-dimensional word vector and a (n+1)th value of the first (n+1)-dimensional word vector is set to an average of the first to $n^{th}$ values of the first n-dimensional word vector;
   generating a second (n+1)-dimensional word vector corresponding to a second n-dimensional word vector for a second word, wherein first to $n^{th}$ values of the second (n+1)-dimensional word vector are set to be equal to first to $n^{th}$ values of the second n-dimensional word vector and a (n+1)th value of the second (n+1)-dimensional word vector is set to an average of the first to $n^{th}$ values of the second n-dimensional word vector;
   determining whether the first word and the second word are similar to each other on the basis of specified synonym information;
   updating the (n+1)th value of the first (n+1)-dimensional word vector and the (n+1)th value of the second (n+1)-dimensional word vector based on the first word and the second word being determined to be similar to each other; and
   correcting the first and second n-dimensional word vectors by applying the (n+1)th values of the first and second (n+1)-dimensional word vectors to each of the n values of the first and second n-dimensional word vectors.

2. The word vector correction method of claim 1, wherein the updating comprises:
   calculating an average of the (n+1)th value of the first (n+1)-dimensional word vector and the (n+1)th value of the second (n+1)-dimensional word vector; and
   changing the (n+1)th values of each of the first and second (n+1)-dimensional word vectors to the calculated average when the first word and the second word are determined to be similar to each other.

3. The word vector correction method of claim 2, wherein when the first word and the second word are determined not to be similar to each other, the (n+1)th values of the first and second (n+1)-dimensional word vectors are not changed.

4. The word vector correction method of claim 1, wherein,
   0 to nth values of the first (n+1)-dimensional word vector are the same as those of the first n-dimensional word vector, and
   0 to nth values of the second (n+1)-dimensional word vector are the same as those of the second n-dimensional word vector.

5. The word vector correction method of claim 1, wherein the correcting comprises applying a linear discriminant analysis (LDA) algorithm to apply the (n+1)th values of the first and second (n+1)-dimensional word vectors to the values of the first and second n-dimensional word vectors, respectively.

6. The word vector correction method of claim 5, wherein a distance between the first and second n-dimensional word vectors in a vector space after the correction is different from a distance between the first and second n-dimensional word vectors before the correction.

7. The word vector correction method of claim 6, wherein the distance between the first and second n-dimensional word vectors in the vector space after the correction is less than the distance between the first and second n-dimensional word vectors before the correction when the first word and the second word are determined to be similar to each other.

8. The word vector correction method of claim 7, wherein the distance between the first and second n-dimensional word vectors in the vector space after the correction is greater than the distance between the first and second n-dimensional word vectors before the correction when the first word and the second word are determined to not be similar to each other.

9. The word vector correction method of claim 1, wherein the specified synonym information comprises a learning model for distributed word representation.

10. A word vector correction method comprising:
    based on a first n-dimensional word vector for a first word, determining a first average value of the n values in the first n-dimensional word vector;
    based on a second n-dimensional word vector for a second word, determining a second average value of the n values in the second n-dimensional word vector;
    determining whether the first word and the second word are similar to each other; and
    correcting the first and second n-dimensional word vectors by applying a first calculated value to the values of the first n-dimensional vector and a second calculated value to the values of the second n-dimensional vector,
    wherein based on the first word and the second word being determined to be similar to each other, the first calculated value and the second calculated value both equal an average of the first average value and the second average value, and
    wherein based on the first word and the second word being determined not to be similar to each other, the first calculated value is equal to the first average value and the second calculated value is equal to the second average value.

11. The word vector correction method of claim 10, wherein the correcting comprises using a linear discriminant analysis (LDA) algorithm to apply the first calculated value to the values of the first n-dimensional word vector and to apply the second calculated value to the values of the second n-dimensional word vector.

12. The word vector correction method of claim 11, wherein the similarity between the first word and the second word is determined using a learning model for distributed word representation.

13. A machine-readable non-transitory medium having stored thereon machine-executable instructions for word vector correction, the instructions comprising:
- based on a first n-dimensional word vector for a first word, determining a first average value of the n values in the first n-dimensional word vector;
- based on a second n-dimensional word vector for a second word, determining a second average value of the n values in the second n-dimensional word vector;
- determining whether the first word and the second word are similar to each other; and
- correcting the first and second n-dimensional word vectors by applying a first calculated value to the values of the first n-dimensional vector and a second calculated value to the values of the second n-dimensional vector,
- wherein based on the first word and the second word being determined to be similar to each other, the first calculated value and the second calculated value both equal an average of the first average value and the second average value, and
- wherein based on the first word and the second word being determined not to be similar to each other, the first calculated value is equal to the first average value and the second calculated value is equal to the second average value.

14. The machine-readable non-transitory medium of claim 13, wherein the correcting comprises using a linear discriminant analysis (LDA) algorithm to apply the first calculated value to the values of the first n-dimensional word vector and to apply the second calculated value to the values of the second n-dimensional word vector.

15. The machine-readable non-transitory medium of claim 14, wherein the similarity between the first word and the second word is determined using a learning model for distributed word representation.

* * * * *